United States Patent [19]

Watanabe

[11] Patent Number: 4,708,486
[45] Date of Patent: Nov. 24, 1987

[54] IMAGE-FORMING APPARATUS
[75] Inventor: Junji Watanabe, Yokohama, Japan
[73] Assignee: Kabushiki Kaisha Toshiba, Kawasaki, Japan
[21] Appl. No.: 861,346
[22] Filed: May 9, 1986
[30] Foreign Application Priority Data May 20, 1985 [JP] Japan ................................ 60-107707
May 20, 1985 [JP] Japan ................................ 60-107709

[51] Int. Cl.$^4$ .................... H04N 1/21; H04N 1/04; G03G 15/28
[52] U.S. Cl. ........................................ 358/296; 355/7; 355/8; 358/285
[58] Field of Search ............... 355/3 R, 14 SH, 14 C, 355/3 SH, 7, 8; 346/76 PH; 358/296, 288, 286, 287

[56] References Cited

U.S. PATENT DOCUMENTS

| 4,251,822 | 2/1981 | Hara et al. ..................... 346/155 X |
| 4,564,792 | 1/1986 | Fukushi ........................ 355/3 SH X |
| 4,571,067 | 2/1986 | Nishiyama .................... 355/3 SH X |

Primary Examiner—Clifford C. Shaw
Assistant Examiner—Linda M. Peco
Attorney, Agent, or Firm—Schwartz, Jeffery, Schwaab, Mack, Blumenthal & Evans

[57] ABSTRACT

Image-forming apparatus comprising an original document table on which an original document can be placed, an optical scanning mechanism for optically scanning an original document placed on the original document table, a moving mechanism which can cause reciprocal movement of this optical scanning mechanism parallel to the original document table, a specification switch for specifying the size of an original document placed on the original document table, detection switches which detect the position in which the optical scanning mechanism has been halted after being moved by the moving mechanism, a transferring mechanism that compares a first distance between the halt position of the optical scanning mechanism detected by the detection switches and one edge portion, going in the direction of scanning, of an original document of a size specified by the specification switch and a second distance between the optical scanning mechanism's halt position and the other edge portion of the original document and which can transfer the optical scanning mechanism to the edge portion of the original document which corresponds to that of the first and second distances which has been found to be the shorter in this comparison, a photoreceptor which picks up light reflected from the document on the optical scanning mechanism which has been transferred to the original document's edge portion being caused to scan the original document by the moving mechanism and an image-forming mechanism by which an original document image picked up by the photoreceptor is reproduced on recording material.

20 Claims, 12 Drawing Figures

IMAGE-FORMING APPARATUS

BACKGROUND OF THE INVENTION

1. Field of the Invention

The present invention relates to a scanning printer or similar image-forming apparatus.

2. Discussion of Background

A recent development in connection with image-forming apparatus such as photocopiers, etc. is a portable scanning printer using batteries as a power supply. With this scanning printer, an original document placed on an original document table is scanned in a set direction and has its image information read by a scanner section consisting of an optical system and a CCD (charge coupled device) or similar photosensitive element, and a thermal head is driven in accordance with the image information that has been read to form an image by effecting transfer of a corresponding image onto copy paper.

However, when an image corresponding to an original document is formed by an apparatus such as this, the formation of the image is effected by moving the optical system in the scanner section with respect to the whole surface of the original document table, irrespective of the size of the original document. Because of this, there is wasteful scanning action and the battery life is shortened. Further, there is wasteful return action, since the optical system always starts from one side of the original document table.

OBJECT OF THE INVENTION

It is the object of the present invention to provide an image-forming apparatus which is designed to shorten the image formation time and to save power by shortening of the distance over which an optical scanning means moves.

SUMMARY OF THE INVENTION

In order to achieve the above object, the image-forming apparatus of the present invention is an apparatus such that at the start of scanning by a scanning means that effects optical scanning of an original document placed on an original document table, the current position of the scanning means and the positions f opposite sides of an original document as judged on the basis of the original document size are compared and image formation is started after the scanning means has been moved in accordance with the findings of this comparison to the nearer of the sides.

DETAILED DESCRIPTION OF THE PREFERRED EMBODIMENTS

A description of one embodiment of the present invention will now be given with reference to the drawings.

Figure 1:
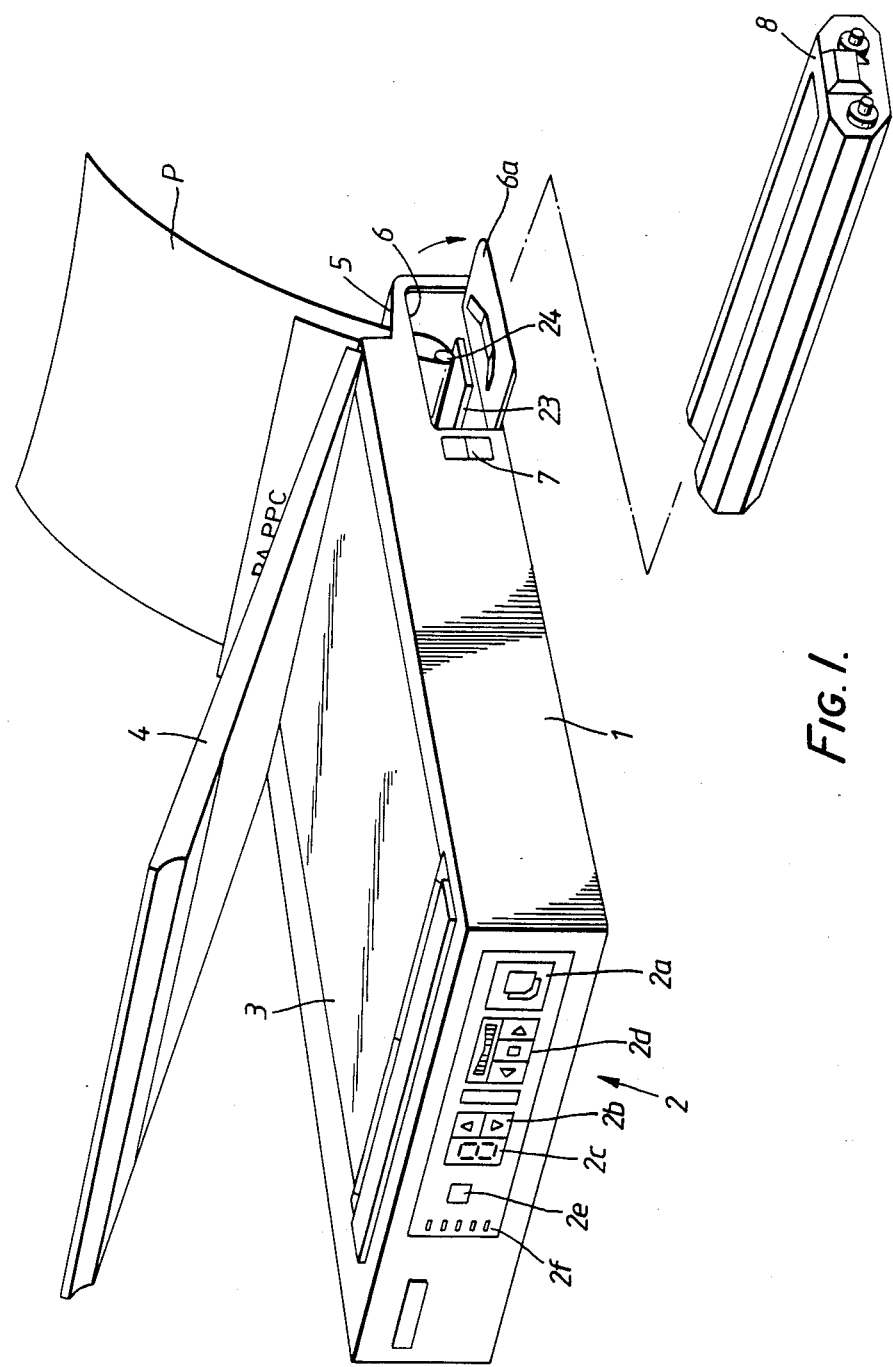
FIG. 1 is a perspective view showing the external appearance of the image-forming apparatus of the present invention.
Figure 2:
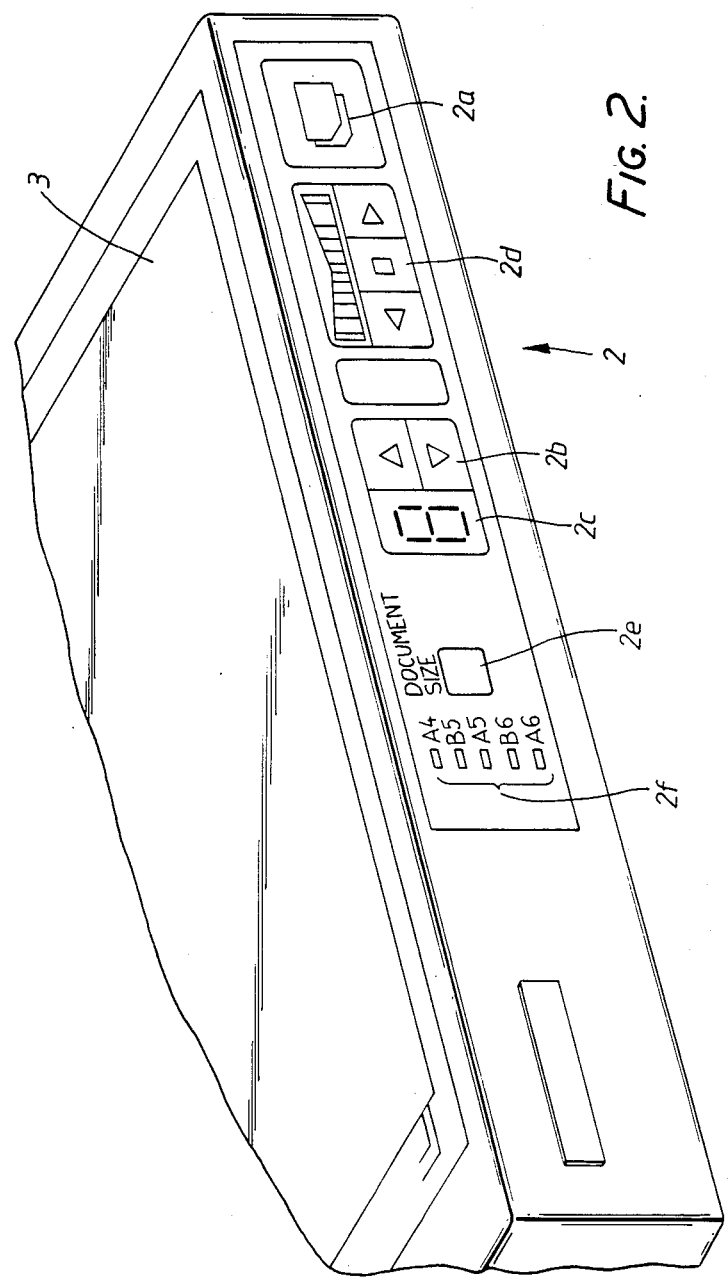
FIG. 2 is a perspective view showing the control section of the image-forming apparatus shown in FIG. 1.

FIG. 1 is a general sketch showing the external appearance of a scanning printer as an image-forming apparatus of the present invention. A main body 1 is rectangular and on its upper surface there is provided an original document table (transparent glass plate ) 3 for supporting an original document G that is, e.g., size A4 or size B5, etc. An openable and closable original document cover 4 is provided near original document table 3. As shown in FIG. 2, on the front surface, which goes along a long side of main body 1, there is provided a control panel 2 constituted by a print start switch 2a, a sheet number specification switch 2b for setting the number of sheets that are printed, a sheet number display section 2c that displays a printed sheet number 1–9 that is set by sheet number specification switch 2b, a density adjustment key 2d, an original document size specification key 2e and an original document size display section 2f in which LEDs light up to display the original document size selected by original document size selection key 2e.

In the rear edge portion going along a long side of main body 1, there is provided a paper opening 5 for permitting insertion and discharge of paper P as recording material. In a side surface of main body 1, there is a ribbon cassette loading port 6 on which there is provided an openable and closable cover 6a. A power supply switch 7 is provided alongside loading port 6.

Figure 3:
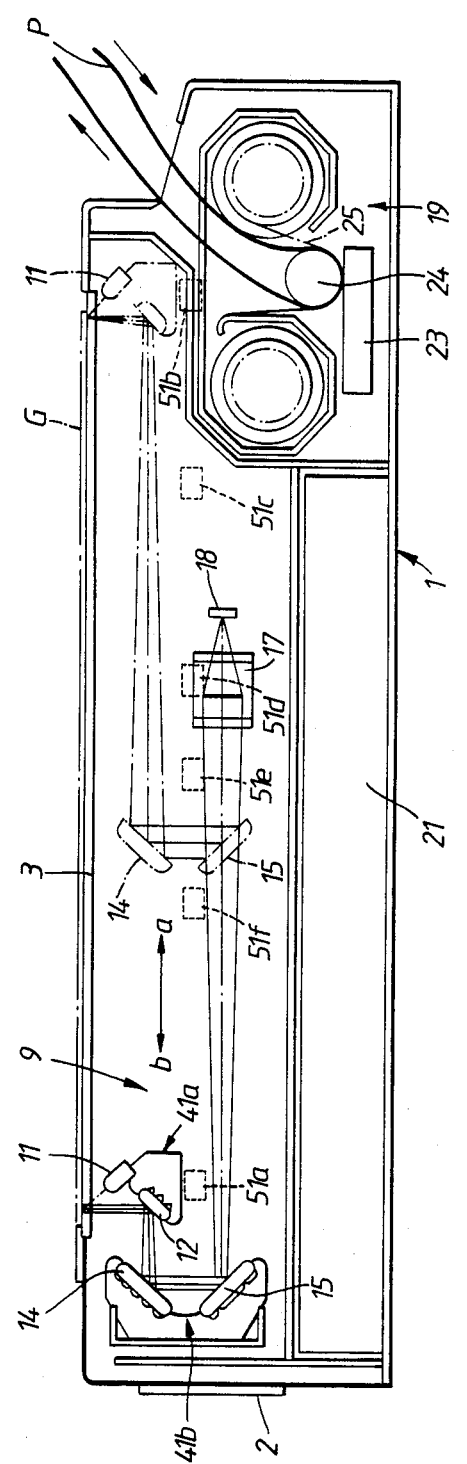
FIG. 3 is a front view showing the interior of the image-forming apparatus shown in FIG. 1.

As shown in FIG. 3, at the lower surface side of original document table 3, there is provided a scanning unit 9 that moves reciprocally in the direction of the arrows shown in the drawings and consists of an exposure lamp 11, mirrors 12, 14 and 15 and a lens block 17. The arrangement is such that optical scanning of the surface of an original document by scanning unit 9 results in the image of the original document being focussed on the surface of an image sensor 18 constituted by a photosensitive element, e.g., a CCD (charge-coupled device). Image sensor 18 outputs electrical signals corresponding to the focussed image to a CPU 61 that is described later.

Figure 4:
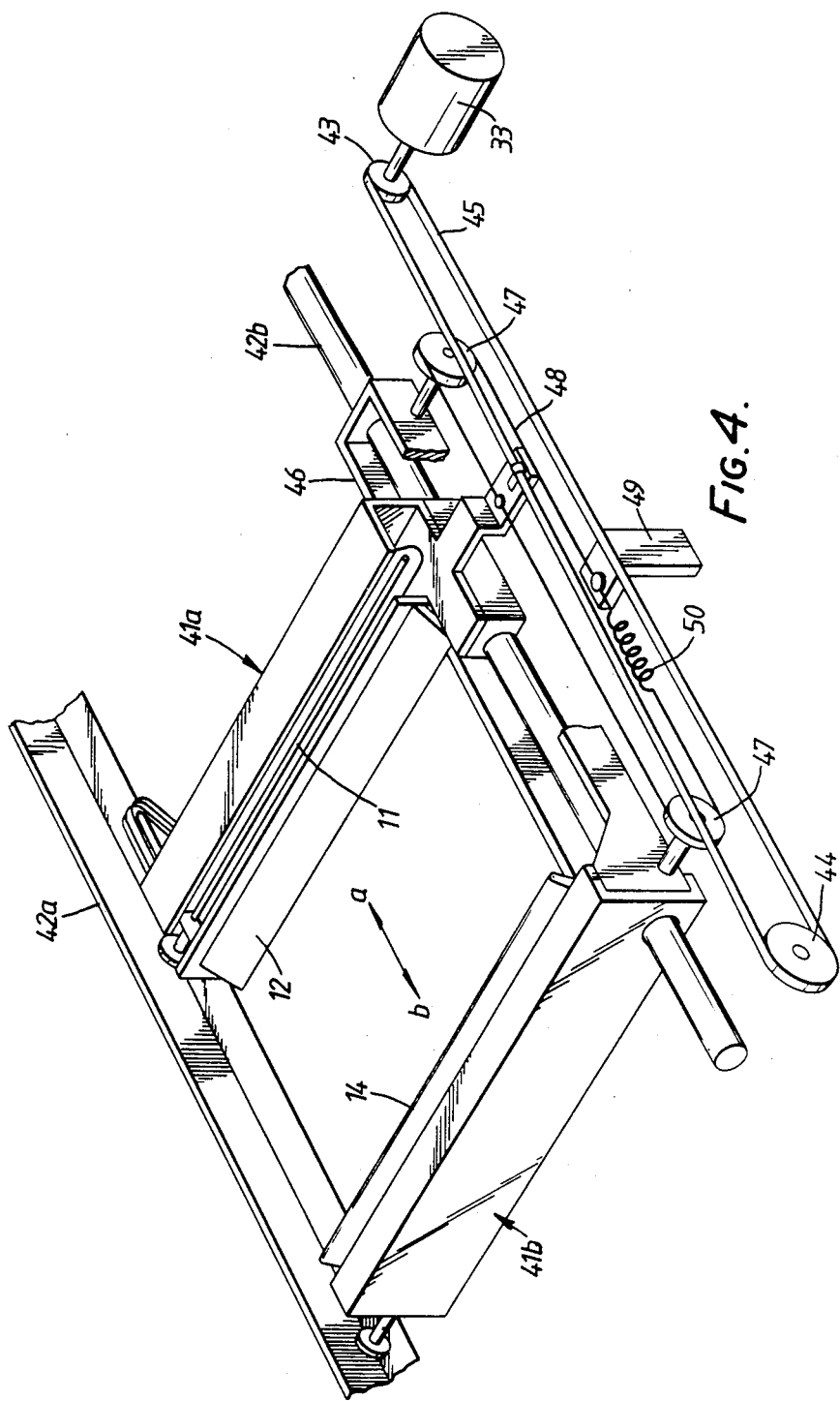
FIG. 4 is a perspective view showing the structure of an optical carriage that is shown in FIG. 3.

FIG. 4 shows the drive mechanism for causing reciprocal movement of the carriage of scanning unit 9. Mirror 12 and exposure lamp 11 are supported by a first carriage 41a, while mirrors 14 and 15 are supported by a second carriage 41b. These carriages 41a and 41b are guided by guide rails 42a and 42b and can move freely in parallel in the direction of the arrows a and b. In more detail, a 4-phase pulse motor 33 drives a pulley 43, and between this pulley 43 and an idle pulley 45 there extends an endless belt 45 which has an intermediate portion fixed to one end of first carriage 41a supporting mirror 12. Pulse motor 33 is a motor for causing scanning of original documents and it causes movement of exposure lamp 33 and mirrors 12, 14 and 15.

In the guide section 46 of second carriage 42b supporting mirrors 14 and 15, there are two freely rotatable pulleys 47 and 47 that are provided separated from one another in the direction of the axis of rail 42b. A wire 48 extends around and between these pulleys 47 and 47 and has one end fixed to a fixed element 49 and its other end fixed via a coil spring 50 to fixed element 49. One end of first carriage 41a is fixed to an intermediate portion of wire 48. Thus, rotation of pulse motor 33 results in rotation of belt 45 and movement of first carriage 41a, and this is accompanied by movement of second carriage 41b too. As pulleys 47 and 47 serve as running blocks at this time, second carriage 41b moves in the same direction as first carriage 41a but at half its speed. The direction of movement of first and second carriages 41a and 41b is controlled by changing the direction of rotation of pulse motor 33.

As shown in FIG. 3, there is provided a home position detection switch 51a which is actuated through contact with first carriage 41a supporting mirror 12 when exposure lamp 11 and mirrors 12, 14 and 15 are brought into correspondence with the home position. The "home position" means when the position of illumination by exposure lamp 11 is the position at point A shown in FIG. 6. Further, switches 51b, 51c, 51d, 51e and 51f are disposed in order, going from right to left as seen in the drawing, along the path of movement of first carriage 41a. Switch 51b is located in a position corresponding to an A4 original document size, switch 51c in a position corresponding to B5, switch 51d in a position corresponding to A5, switch 51e in a position corresponding to B6 and switch 51f in a position corresponding to A6. Like the abovenoted home position switch 51a, these switches 51b-51f are similarly actuated by contact with carriage 41a.

As shown in FIG. 1 and FIG. 3, printing section 19 is provided in the lower portion of paper opening 5. This printing section 19 consists of a thermal head 23 constituting a recording head, a platen 24 and an ink ribbon cassette 8 with thermal transfer ink ribbon 25 for effecting transfer. The arrangement is such that paper P inserted via paper opening 5 and thermal transfer ink ribbon 25 come into correspondence between platen 24 and thermal head 23. A control section 21 which effects electrical control of the entire apparauts is provided below optical scanning unit 9.

Figure 5:
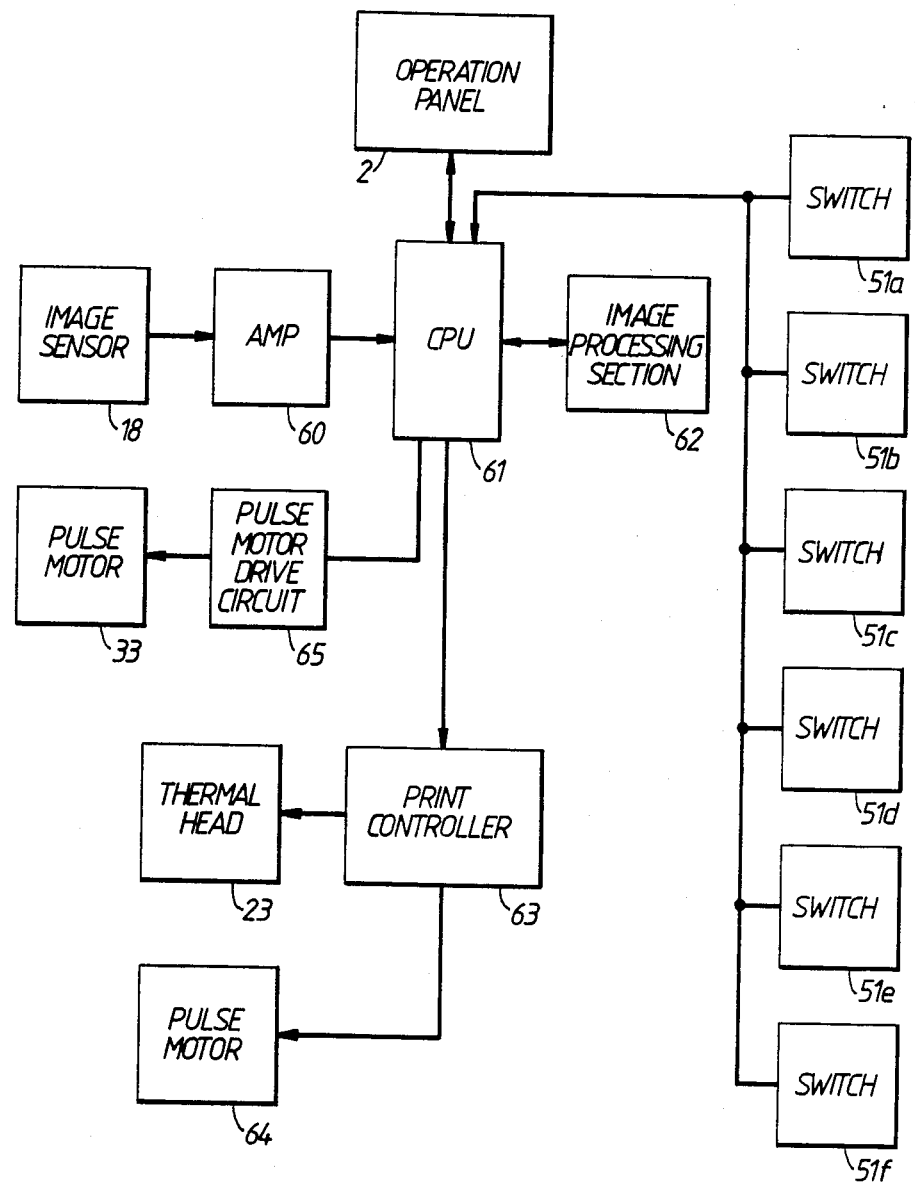
FIG. 5 is a block diagram for explanation of the electrical operation of the image-forming apparatus of the invention.

Control section 21 has the configuration shown in FIG. 5. Image information output by image sensor 18 is supplied via an amplifier 60 to CPU 61, which controls the whole apparatus. CPU 61 stores the image information supplied from image sensor 18 in an image processing section 62. Image processing section 62 stores the image information for one picture that has been processed by image sensor 18. Since the direction of feed of paper P is always constant, CPU 61 records signals read by image sensor 18 as they are in image processing section 62 when optical scanning unit 9 moves in direction a, but reverses them and stores them in image processing section 62 when optical scanning unit 9 moves in direction b.

When the image information for one picture is stored in image processing section 62, CPU 61 reads it out sequentially one line at a time and outputs it to a printing control section 63 which serves to drive thermal head 13 and also to effect one-line drive of a pulse motor 64 that drives platen 24 in response to the signals for each line with which it is supplied. CPU 61 also effects control of a drive section 65 that drives pulse motor 33. The arrangement is, for example, such that rotation of pulse motor 33 in the forward direction results in optical scanning unit 9 moving in direction a (forward movement) and reverse rotation of pulse motor 33 results in optical scanning unit 9 moving in direction b (return movement). (See FIG. 3 and FIG. 4.)

CPU 61 can also determine, by means of the detection signals from switches 51a-51f, whether the position at which optical scanning unit 9 is currently halted is the home position or a position corresponding to a particular original document size. Switches 51a-51f are also connected so as to permit control of the position at which unit 9 is halted when it is moved to a position corresponding to an original document size specified by an operator. A power supply 66 is constituted, e.g., by batteries, etc. and serves to drive the various sections noted above.

First and second carriages 41a and 41b of optical scanning unit 9 scan an original document G on original document table 3 upon depression of print switch 2a, and on completion of scanning, they stop in the position in which they are on this completion.

Original document sizes are specified by original document size specification key 2e, and if first and second carriages 41a and 41b are located in the home position when an original document G has been set on the original document table 3, they start scanning from the home position in response to actuation of print start switch 2a. If they are not located in the home position, first and second carriages 41a and 41b are moved by the action of pulse motor 33 to the home position or to the right-hand edge of the original document G, whichever is the nearer, and they start scanning from this position.

Figure 12:
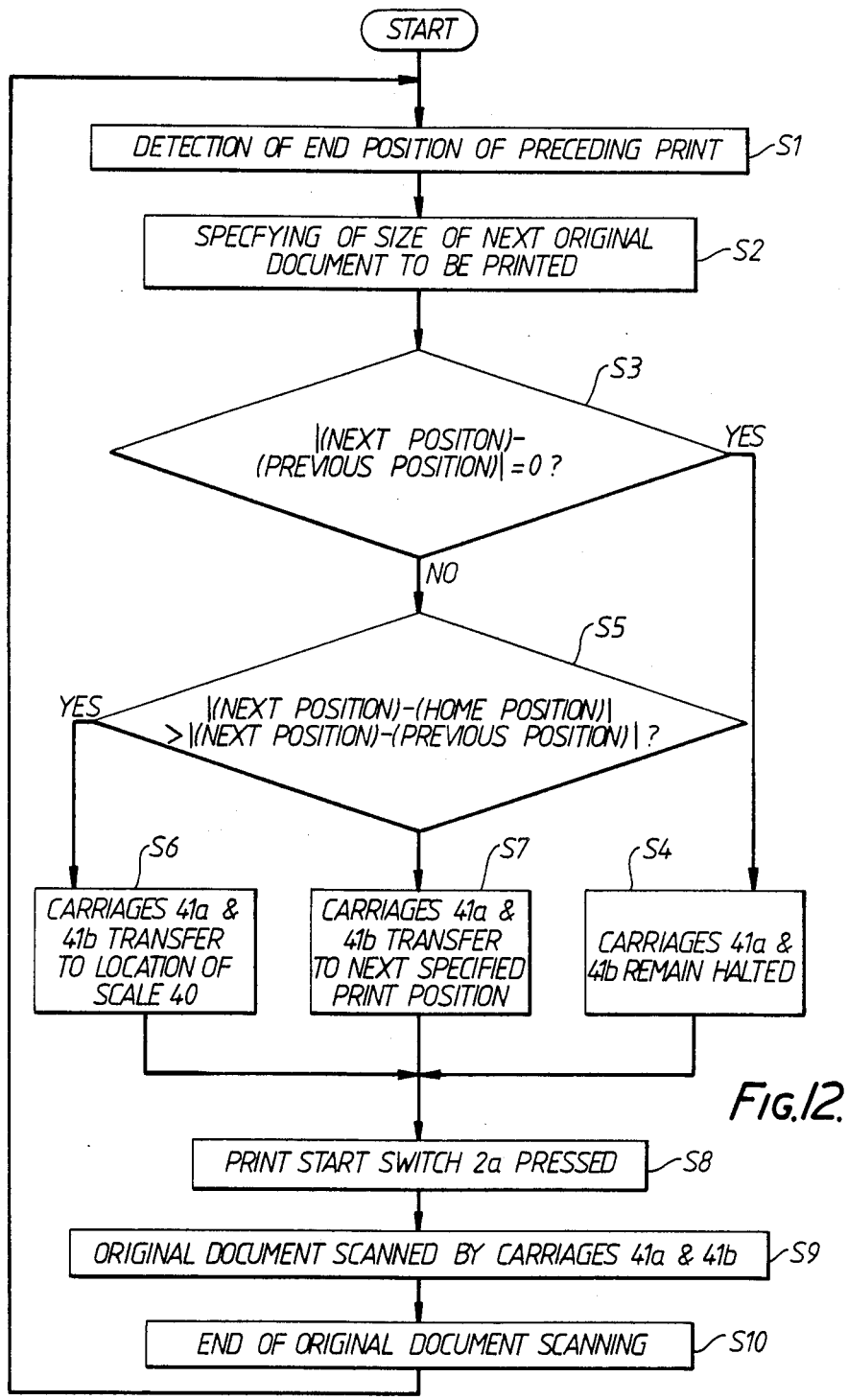
FIG. 12 is a flowchart for explaining the operation of the image-forming apparatus of the present invention.

In more detail, as shown in the flowchart of FIG. 12, one of the switches 51a-51f detects the position at which carriages 41a and 51b have halted on completion of a print operation by the preceding operator (S1) and this halt position is stored in CPU 61. The operator who is next to effect a print operation presses the original document size specification key 2e to specify the required original document size (S2). The selection signal from specification key 2e is input to CPU 61 and CPU 61 compares (S3) the position corresponding to the original document size specified in step S2 and the halt position detected in step S1. If they are found to be equal in the comparison, i.e., if the result of subtraction between the next position and the previous position is "0", carriages 41a and 41b do not move but remain halted (S4), and this position at which they remain halted constitutes the scanning start position when the next print operation is effected. If the result of the subtraction in step S3 is not "0", the following comparison is made. The distance from the next position to the edge of original document table 3, i.e., to the home position, is compared with the distance that is the difference between the position corresponding to the original document size specified in step S2 and the halt position detected in step S1 to see if it is larger (S5). If the result of the comparison in step S5 shows that it is larger, i.e., if it is found that the home position is nearer than the next position, carriages 41a and 41b are moved by rotation of pulse motor 33 to the position corresponding to the home position (S6), and this position constitutes the scanning start position when the next printing operation is effected. If the result of the comparison in step S5 shows it to be smaller, i.e., the next position is found to be nearer than the home position, carriages 41a and 41b are moved by rotation of pulse motor 33 to the next position (S7) and this position constitutes the scanning start position when the next printing operation is effected.

Then, the scanning start position of carriages 41a and 41b having been set, print start switch 2a is pressed by the operator (S8). Receiving input of a start signal, CPU 61 supplies pulse motor 33 with drive signals to a set number of pulses via a pulse motor drive circuit 65. Hereupon, pulse motor 33 rotates, carriages 41a and 41b are moved a distance corresponding to the original document size, the original document is illuminated by lamp 11 and a scanning operation is carried out (S9). At the scanning end position, one of switches 51a–51f is pressed by carriage 41a or 41b and an end position signal is input to and stored by CPU 61 (S10). There is subsequently a return to step S1 on execution of a printing operation by the next operator.

Figure 6:
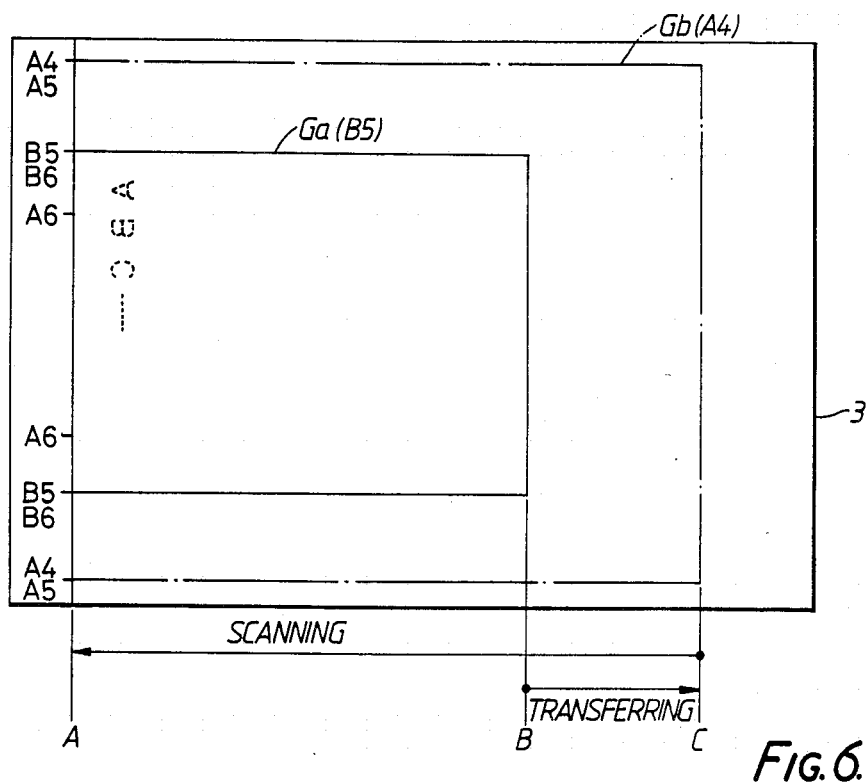
FIG. 6 is a plane view of an original document table showing how the optical carriage moves with respect to an original document.

For example, the previous operator has completed printing for an original document Ga of size B5, and switch 51c detects that carriages 41a and 41b of optical scanning unit 9 are in position B indicated in FIG. 6 and its detection signal is input to CPU 61 (step S1 of FIG. 12). The next operator places an original document Gb of size A4 on original document table 3, inserts paper P via paper opening 5 and specifies the size of original document Gb (size A4) by means of original document size specification key 2e on control panel 2 (step S2 of FIG. 12). CPU 61, having determined that optical scanning unit 9 is in a position corresponding to point B in step S1 of FIG. 12, compares the distances from this point B to point A and point C corresponding to the edges of original document Gb and determines that point C is nearer than point A, the home position (steps S3 and S5 of FIG. 12). In accordance with this findings, CPU 61 drives pulse motor 33 in the forward direction, and optical scanning unit 9 moves to point C and stops (step S6 of FIG. 12).

Then, when the operator presses print start switch 2a (step S8), CPU 61 drives pulse motor 33 in reverse, so moving optical scanning unit 9, i.e., exposure lamp 11 and mirrors 12, 14 and 15, from point C. In other words optical system 9 moves in direction b (return movement). CPU 61 also controls light of exposure lamp 11. As a result, light from exposure lamp 11 is radiated onto original document Gb on original document table 3 (is radiated starting from point C) and is led successively via reflecting mirrors 12, 14 and 15 to irradiate image sensor 18 (step S9), thereby projecting an image corresponding to original document Gb onto image sensor 18. Hereupon, image sensor 18 converts this image into electrical signals and outputs these electrical signals in bit units to CPU 61 via amplifier 60. As a result, CPU 61 reverses the signals supplied from image sensor 18 and stores them in image processing section 62. When illumination up to point A has been effected, CPU 61 stops pulse motor 33, so stopping optical system 9 (step S10).

Figure 7:
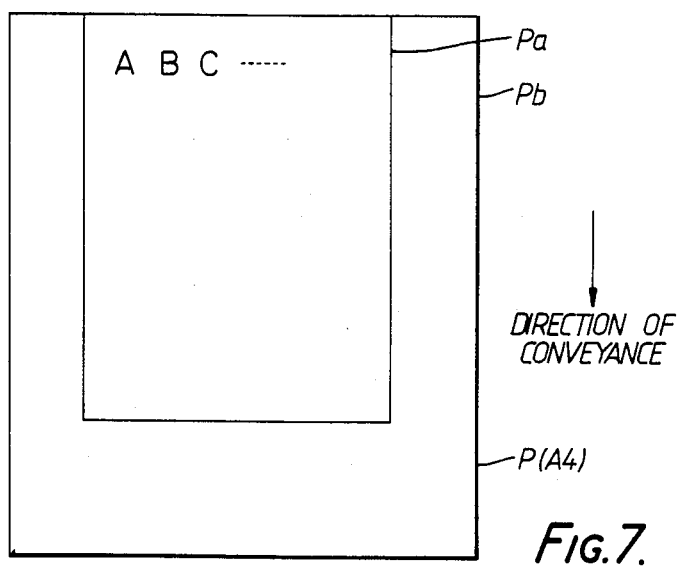
FIG. 7 is a plane view showing copy paper on which a copy has been made on execution of a copying operation with respect to the original document shown in FIG. 6.

Next, image information for one picture having been stored in image processing section 62, CPU 61 reads it out one line at a time and outputs it to printing control section 63. In response to each line of signals supplied to it, printing control section 63 drives thermal head 23 and effects one-line drive of pulse motor 64 driving platen 24. This results in transfer onto paper P in accordance with thermal head 23 drive and hence formation of an image corresponding to original document Gb. As a result, an image of original document Gb is printed in the print area P6 of paper P, as shown in FIG. 7.

Figure 8:
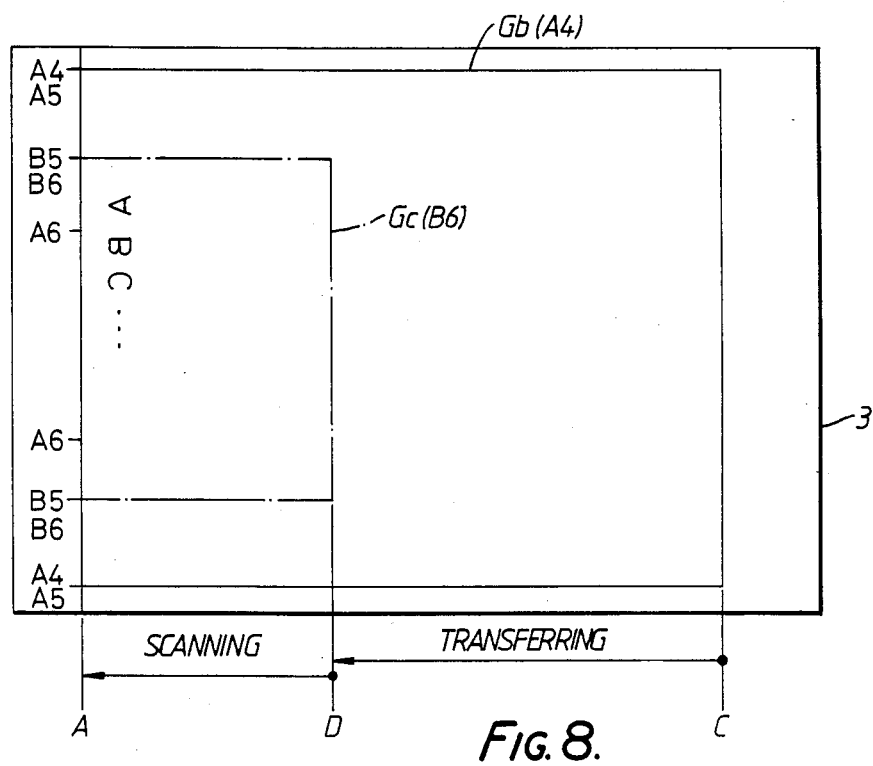
FIG. 8 is a plane view of an original document table showing how the optical carriage moves with respect to an original document.

The operator further places a size B6 original document Gc on original document table 3, as shown in FIG. 8, inserts paper P via paper opening 5 and specified the size B6 of original document Gc by means of original document size specification key 2e on control panel 2 (step S2). Hereupon, CPU 61, having determined from the detection signal from switch 51b that optical scanning unit 9 is in a position corresponding to point C (step S1), compares the distances from point C to point A and point D corresponding to the edges of original document Gc and determines that point D is nearer than point A (steps S3 and S5). In accordance with this finding, CPU 61 drives pulse motor 33 in reverse to bring optical scanning unit 9 to point D and then stops it (step S7).

Figure 9:
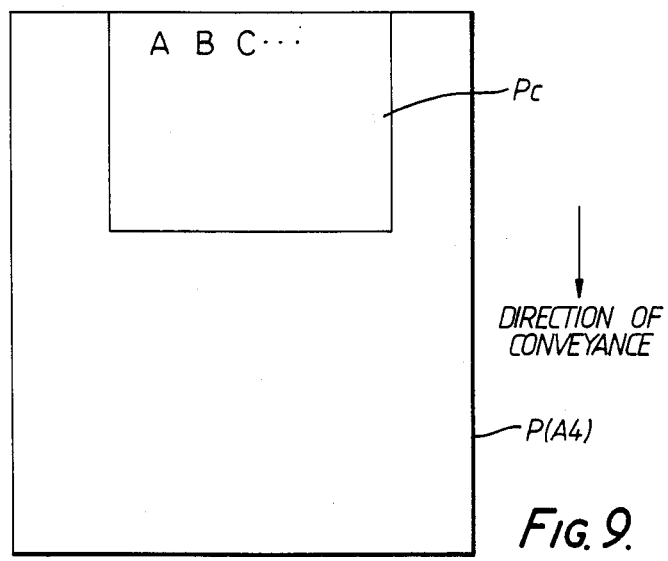
FIG. 9 is a plane view showing copy paper on which a copy has been made on execution of a copying operation with respect to the original document shown in FIG. 8.

When, next, the operator presses print start switch 2a (step S8), CPU 61 drives pulse motor 33 in reverse, so moving optical scanning unit 9, i.e., exposure lamp 11 and mirrors 12, 14 and 15, from point D. In other words, optical scanning unit 9 moves in direction b (return movement). CPU 61 also controls light of exposure lamp 11. As a result, light from exposure lamp 11 is radiated onto original document Gb on original document support (is radiated starting from point D) and is led successively via reflecting mirrors 12, 14 and 15 to irradiate image sensor 18 (step S9), thereby projecting an image corresponding to original document Gb onto image sensor 18. Hereupon, image sensor 18 converts this image into electrical signals and outputs these electrical signals in bit units to CPU 61 via amplifier 60. As a result, CPU 61 reverses the signals supplied from image sensor 18 and stores them in image processing section 62. When illumination up to point A has been effected, CPU 61 stops pulse motor 33, so stopping optical scanning unit 9 (step S10). Next, image information for one picture having been stored in image processing section 62, CPU 61 reads it out one line at a time and outputs it to printing control section 63. In response to each line of signals supplied to it, printing control section 63 drives thermal head 23 and effects one-line drive of pulse motor 64 driving platen 24. This results in transfer onto paper P in accordance with thermal head 23 drive and hence formation of an image corresponding to original document Gc. As a result, an image of original document Gc is printed in the print area Pc of paper P as show in FIG. 9.

Figure 10:
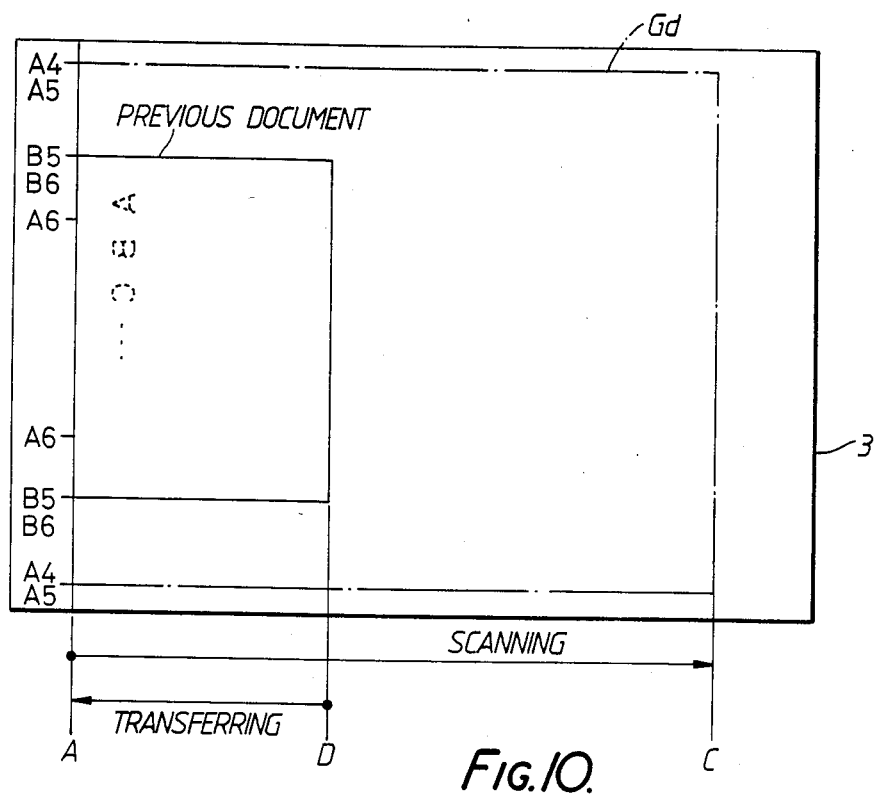
FIG. 10 is a plane view of the original document table showing how the optical system moves with respect to an original document.

The operator further places a size A4 original document Gd on original document table 3, as shown in FIG. 10, inserts paper P via paper opening 5 and specifies the size A4 of original document Gd by means of original document size specification key 2e on control panel 2 (step S2). Hereupon, CPU 61, having determined from the detection signal from switch 51e that optical scanning unit 9 is in a position corresponding to point D (steps S1), compares the distances from point D to point A and point C corresponding to the edges of original document Gc and determines that point A is nearer than point C (steps S3 and S5). In accordance with this finding, CPU 61 drives pulse motor 33 in reverse to bring optical scanning unit 9 to point A and then stops it (step S6).

Figure 11:
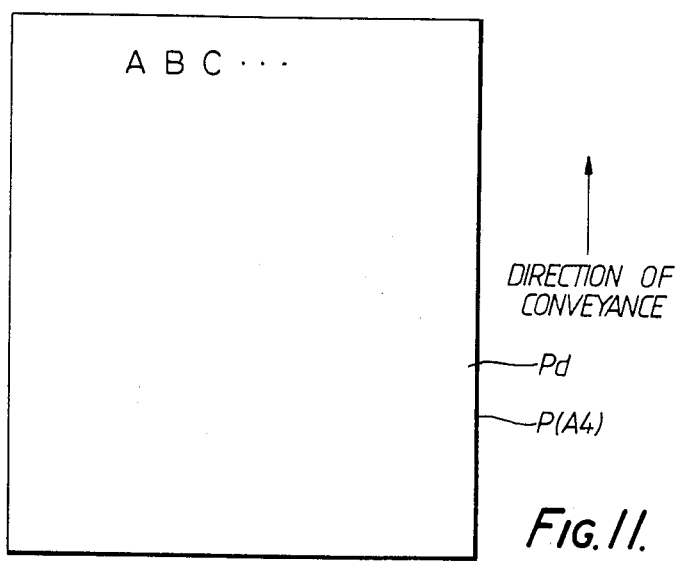
FIG. 11 is a plane view showing copy paper on which a copy has been made on execution of a copying operation with respect to the original document shown in FIG. 10.

When, next, the operator presses print start switch 2a (step S8), CPU 61 drives pulse motor 33 forwards, so moving optical system 9, i.e., exposure lamp 11 and mirrors 12, 14 and 15, from point A. In other words, optical scanning unit 9 moves in direction a (forward movement). CPU 61 also controls light of exposure lamp 11. As a result, light from exposure lamp 11 is radiated onto original document Gd on original document table 3 (is radiated starting from point A) and is led successively via reflecting mirrors 12, 14 and 15 to irradiated image sensor 18 (step S9), thereby projecting an image corresponding to original document Gd onto image sensor 18 (step S9). Hereupon, image sensor 18 converts this image into electrical signals and outputs these electrical signals in bit units to CPU 61 via amplifier 60. As a result, CPU 61 stores the signals supplied from image sensor 18 in image processing section 62. When illumination up to point C has been effected, CPU 61 stops pulse motor 33, so stopping optical system 9 (step S10). Next, image information for one picture having been stored in image processing section 62, CPU 61 reads it out one line at a time and outputs it to printing control section 63. In response to each line of signals supplied to it, printing control section 63 drives thermal head 23 and effects one-line drive of pulse motor 64 driving platen 24. This results in transfer onto paper P in accordance with thermal head 23 drive and hence information of an image corresponding to original document Gd. As a result, an image of original document Gd is printed in the print area Pd of Paper P, as shown in FIG. 11.

As described above, specification of the size of an original document at the start of copying results in a comparison of the distances between the optical system's current position and the opposite edges of the original document and printing is effected by the optical scanning unit being moved on the basis of the finding of this comparison to the edge which is nearer and then effecting movement in correspondence to the original document starting from this edge. Thanks to this, the distance over which the optical scanning unit moves is short (minimum), so making it possible to reduce time and save power and also to improve reliability. It is also made possible to keep battery consumption to a minimum.

Although the printing section was a thermal transfer type using thermal transfer ribbon in the abovedescribed embodiment, it is not limited to this but may also be a heat sensitive type using leuco paper or diazo paper, an ink jet type, a wire dot type or an electrostatic printing type. Also, although the arrangement was one in which, depending on the direction of movement of the optical system, the memory contents supplied to the image processing system are changed, there is no need to change the memory contents if one has an apparatus in which the direction of the paper can be changed.

What is claimed as new and desired to be secured by Letters Patent of the United States is:

1. An image-forming apparatus comprising:
   an original document table on which an original document can be placed;
   scanning means for optically scanning the original document placed on the original document table;
   moving means for reciprocally moving the scanning means parallel to the original document table;
   specification means for specifying the size of the original document placed on the original document table;
   detection means for detecting a halt position in which the scanning means has been halted after being moved by the moving means;
   comparison means for comparing a first distance between the halt position of the scanning means detected by the detection means and one edge portion, in correspondence to the direction of scanning, of the original document of a size specified by the specification means and a second distance between the halt position of the scanning means detected by the detection means and the other edge portion of the original document;
   transfer means for transferring the scanning means to the edge portion of the original document which corresponds to that of the first and second distances which the comparison means has found to be shorter;
   receiving means for receiving light reflected from the document on the original document table, the scanning means which has been transferred to the edge portion of the original document, being caused to scan the original document by the moving means; and
   reproducing means for reproducing an original document image received by the receiving means on the recording material.

2. The image-forming apparatus as in claim 1, wherein the scanning means includes:
   a first carriage supporting an exposure lamp which illuminates the original document on the original document table and a first mirror which receives light reflected from the original document that is illuminated by the exposure lamp; and
   a second carriage supporting second and third mirrors which receive light reflected from the first mirror and direct the light toward the receiving means.

3. The image-forming apparatus as in claim 2, wherein the detection means includes:
   a plurality of switches successively disposed along the path of movement of the first carriage of the scanning means in correspondence to original document sizes specified by the specification means.

4. The image-forming apparatus as in claim 1, wherein the receiving means comprises a charge coupled device.

5. The image-forming apparatus as in claim 4, wherein the reproducing means includes:
   a thermal printing head driven on the basis of electrical signals from the charge coupled device corresponding to the image of the original document;
   a platen facing the thermal printing head; and
   a thermal ink ribbon movably disposed between the thermal printing head and the platen that transfers ink onto the recording material due to the heat of the thermal printing head which is driven in correspondence to the original document image.

6. An image-forming apparatus comprising:
   recognizing means for recognizing the size of an original document;
   scanning means for scanning the original document to obtain an optical image of the original document;

detecting means for detecting the position in which the scanning means has been halted;

comparing means for comparing a first distance between the halt position of the scanning means and one edge portion of the original document, the size thereof recognized by the recognizing means, and a second distance between the halt position of the scanning means and the other edge portion of the original document, the size thereof recognized by the recognizing means; and transfer means for transferring the scanning means to the edge portion of the original document corresponding to that of the first and second distances which the comparing means has found to be shorter.

7. The image-forming apparatus as in claim 6, wherein the recognizing means includes a size selection key being operated by an operator to select the size of the original document.

8. The image-forming apparatus as in claim 6, wherein the detecting means includes switch means successively arranged along the path of movement of the scanning means.

9. The image-forming apparatus as in claim 8, wherein the switch means is disposed in a position corresponding to the size of the original documents.

10. The image-forming apparatus as in claim 6, wherein the scanning means includes a movable light source that illuminates the original document.

11. The image-forming apparatus as in claim 6, wherein the scanning means includes receiving means for receiving reflected light from the original document.

12. The image-forming apparatus as in claim 11, wherein the light receiving means includes means for converting the light into electrical signals.

13. The image-forming apparatus as in claim 11, wherein the light receiving means is stationary disposed in the apparatus.

14. An image-forming apparatus comprising:
recognizing means for recognizing the size of an original document;
scanning means for scanning the original document to obtain an optical image of the original document;
detecting means for detecting the position in which the scanning means has been halted;
comparing means for comparing a first distance between the halt position of the scanning means and one edge portion of the original document, the size thereof recognized by the recognizing means, and a second distance between the halt position of the scanning means and the other edge portion of the original document, the size thereof recognized by the recognizing means;
transfer means for transferring the scanning means to the edge portion of the original document corresponding to that of the first and second distances which the comparing means has found to be shorter; and
reproducing means for reproducing an image on a recording material corresponding to the optical image obtained by the scanning means.

15. The image-forming apparatus as in claim 14, wherein the reproducing means includes:
a thermal printing head operatively connected to the scanning means;
a platen facing the thermal printing head; and
a thermal ink ribbon movably disposed between the thermal printing head and the platen that transfers ink onto the recording material due to the heat of the thermal printing head which is driven in correspondence to the optical image obtained by the scanning means.

16. The image-forming apparatus as in claim 14, wherein the recognizing means includes a size selection key being operated by an operator to select the size of the original document.

17. The image-forming apparatus as in claim 14, wherein the detecting means includes switch means successively arranged along the path of movement of the scanning means.

18. The image-forming apparatus as in claim 14, wherein the switch means is disposed in a position corresponding to the size of the original documents.

19. The image-forming apparatus as in claim 14, wherein the scanning means includes a moveable light source which illuminates the original document.

20. The image-forming apparatus as in claim 14, wherein the scanning means includes means for receiving light reflected from the original document.

* * * * *